US012615142B2

(12) United States Patent
Song et al.

(10) Patent No.: US 12,615,142 B2
(45) Date of Patent: Apr. 28, 2026

(54) PUF ID AND PUF ID READER

(71) Applicant: GWANGJU INSTITUTE OF SCIENCE AND TECHNOLOGY, Gwangju (KR)

(72) Inventors: Young Min Song, Gwangju (KR); Min Seok Kim, Gwangju (KR); Gil Ju Lee, Gwangju (KR)

(73) Assignee: GWANGJU INSTITUTE OF SCIENCE AND TECHNOLOGY, Gwangju (KR)

( * ) Notice: Subject to any disclaimer, the term of this patent is extended or adjusted under 35 U.S.C. 154(b) by 624 days.

(21) Appl. No.: 17/592,190

(22) Filed: Feb. 3, 2022

(65) Prior Publication Data

US 2022/0247559 A1 Aug. 4, 2022

(30) Foreign Application Priority Data

Feb. 3, 2021 (KR) ........................ 10-2021-0015703
Sep. 10, 2021 (KR) ........................ 10-2021-0121161

(51) Int. Cl.
| | |
|---|---|
| *H04L 9/08* | (2006.01) |
| *G06F 21/75* | (2013.01) |
| *H04L 9/32* | (2006.01) |
| *H04N 23/10* | (2023.01) |

(52) U.S. Cl.
CPC ............ *H04L 9/0866* (2013.01); *G06F 21/75* (2013.01); *H04L 9/3278* (2013.01); *H04N 23/10* (2023.01)

(58) Field of Classification Search
CPC ..... H04L 9/0866; H04L 9/3278; H04N 23/10; G06F 21/75; G06V 20/80
See application file for complete search history.

(56) References Cited

U.S. PATENT DOCUMENTS

| | | | | | |
|---|---|---|---|---|---|
| 4,210,415 | A * | 7/1980 | Pardo, Jr. | ........... | C08G 18/3225 |
| | | | | | 8/DIG. 11 |
| 6,503,616 | B1 * | 1/2003 | Jalan | ........................ | C08K 3/36 |
| | | | | | 428/323 |
| 7,285,637 | B2 * | 10/2007 | Armato | ............... | A61L 27/3604 |
| | | | | | 435/7.1 |
| 8,728,498 | B2 * | 5/2014 | Zhang | .................... | A61P 31/00 |
| | | | | | 424/443 |

(Continued)

FOREIGN PATENT DOCUMENTS

| | | |
|---|---|---|
| JP | 2834524 B2 | 12/1998 |
| JP | 2011028050 A | 2/2011 |

(Continued)

OTHER PUBLICATIONS

Zhou; B., Wang; H., Structure and Functions of Cocoons Constructed by Eri Silkworm, Nov. 16, 2020, Polymers (Basel), 12(11):2701.*

(Continued)

*Primary Examiner* — Hadi S Armouche

(74) *Attorney, Agent, or Firm* — Heidi Eisenhut; LOZA & LOZA, LLP

(57) ABSTRACT

A physically unclonable function (PUF) identifier (ID) includes a random fibrous medium and a frame configured to support the random fibrous medium. According to the present disclosure, it is possible to implement a PUF ID that is inexpensive and excellent in encryption performance, and PUF ID reader that reads the PUF ID.

8 Claims, 10 Drawing Sheets

(56) References Cited

U.S. PATENT DOCUMENTS

| | | | | |
|---|---|---|---|---|
| 9,876,647 B2 * | 1/2018 | Kim | .................... | G06F 21/602 |
| 11,170,115 B2 * | 11/2021 | Lu | .......................... | G06F 21/73 |
| 2011/0270092 A1 | 11/2011 | Kang et al. | | |
| 2013/0133077 A1 | 5/2013 | Cho | | |
| 2014/0310515 A1 * | 10/2014 | Kim | .................... | G06F 21/445 |
| | | | | 713/168 |
| 2020/0195446 A1 * | 6/2020 | Lepoint | .............. | H04L 63/0435 |
| 2023/0187371 A1 * | 6/2023 | Parker | ................. | H10W 46/00 |
| | | | | 438/401 |

FOREIGN PATENT DOCUMENTS

| | | | |
|---|---|---|---|
| JP | 2018523240 A | 8/2018 |
| KR | 1020110088676 A | 8/2011 |
| KR | 1020110127812 A | 11/2011 |
| KR | 101104432 B1 | 1/2012 |

OTHER PUBLICATIONS

Ma; M., Hussain; M., Dong; S., Zhou; W., Characterization of the pigment in naturally yellow-colored domestic silk, Aug. 1, 2015, Dyes and Pigments, vol. 124.*
Dictionary.com, "Dye", 2023, Dictionary.com.*
Dictionary.com, "Pigment", 2023, Dictionary.com.*
Leem et al. Edible unclonable functions, Nature Communications, vol. 11, Article 328 (2020).
Kim et al. "Revisiting silk: a lens-free optical physical unclonable function." Nature Communications, vol. 13, Article 247 (2022).

* cited by examiner

Hole density

PUF ID AND PUF ID READER

CROSS-REFERENCE TO RELATED APPLICATIONS

The present application claims priority under 35 U.S.C. 119 and 35 U.S.C. 365 to Korean Patent Application No. 10-2021-0015703 (filed on Feb. 3, 2021) and Korean Patent Application No. 10-2021-0121161 (filed on Sep. 10, 2021), which is hereby incorporated by reference in its entirety.

BACKGROUND

The present disclosure relates to a physically unclonable function (PUF).

It is widely known that an encryption method uses software. A software encryption method can be used universally for various physical devices. However, in a software encryption method, when an encryption key leaks out, information leakage may frequently occur with respect to physical devices using the same software.

In this regard, a physical encryption device may be used to prevent external leakage by making an encryption key inaccessible from the outside of each device. In order to access the encryption key of the physical encryption device, it is necessary to physically decrypt the device. However, processes have to be different for each device so as to prevent the occurrence of devices having the same encryption key when manufacturing physical encryption devices.

In the present disclosure, a physically unclonable function (PUF) device is used as a core principle so as to compensate for the disadvantages of the physical encryption device. The PUF device is a device that uses the uncontrollable disorder occurring during the manufacturing process. Due to characteristics derived from the uncontrollable disorder, even if the same manufacturing process is carried out, macro characteristics do not change, but the PUF device has characteristics that can distinguish individuals, such as human fingerprints. Many devices have been developed by using an optical base, a semiconductor base, and a nanotechnology base.

For example, for the PUF device using optical characteristics, the inventors have proposed 'Edible unclonable functions' Jung Woo Leem, Min Seok Kim, Seung Ho Choi, Seong-Ryul Kim, Seong-Wan Kim, Young Min Song, Robert J. Young & Young L. Kim, Nature Communications volume 11, Article number: 328 (2020)'.

A PUF device having an input and output pair, which is proposed in the related art, has advantages in terms of security and encryption.

However, the related art requires an imaging system that uses a laser, which is a coherent light, and is complex and large-scale so as to obtain a speckle pattern.

SUMMARY

The present disclosure is proposed in the above background and suggests a PUF ID and a PDF ID reader, which can be implemented simply and inexpensively while using a PUF device.

A physically unclonable function (PUF) identifier (ID) according to an embodiment of the present disclosure includes a random fibrous medium and a frame configured to support the random fibrous medium.

The random fibrous medium may be provided with entangled fibers.

When the random fibrous medium is two-dimensionally projected, a projection area includes a portion on which the fibers are projected and a portion on which the fibers are not projected.

When light traveling straight is emitted to the random fibrous medium, there may be a first portion in which the light meets the fibers and a second portion in which the light does not meet the fibers.

The fibers may be opaque.

The portion on which the fibers are not projected may form a closed curve by the fibers.

The closed curve may define a hole.

When the hole is converted into a circle, the circle may have a diameter of 26-47 micrometers.

The random fibrous medium may be a cocoon film.

The random fibrous medium may have a fiber density of 70-90%.

The fiber may include a nanohole.

The fiber may include a dye.

The fiber may include a pigment.

The random fibrous medium may be manufactured by electrospinning.

A PUF ID reader according to another embodiment of the present disclosure may accommodate at least a part of a random fibrous medium.

The PUF ID reader may emit light to the random fibrous medium.

The PUF ID reader may include an image sensor adjacent to the random fibrous medium.

A distance (dis) between the ransom fibrous medium and the image sensor may be within a range of a Fraunhofer region.

A hole provided by the random fibrous medium may have a size of 26-47 micrometers.

The distance (dis) may be 0.2-1.7 millimeters.

A single constructive interference pattern may be formed in the Fraunhofer region.

The light may be incoherent light.

The light may be incoherent red, green, and blue lights.

BRIEF DESCRIPTION OF THE DRAWINGS

FIGS. 6(a), 6(b), 7(a), and 7(b) are views for describing fibers of the random fibrous medium.

DETAILED DESCRIPTION OF THE EMBODIMENTS

Figure 1:
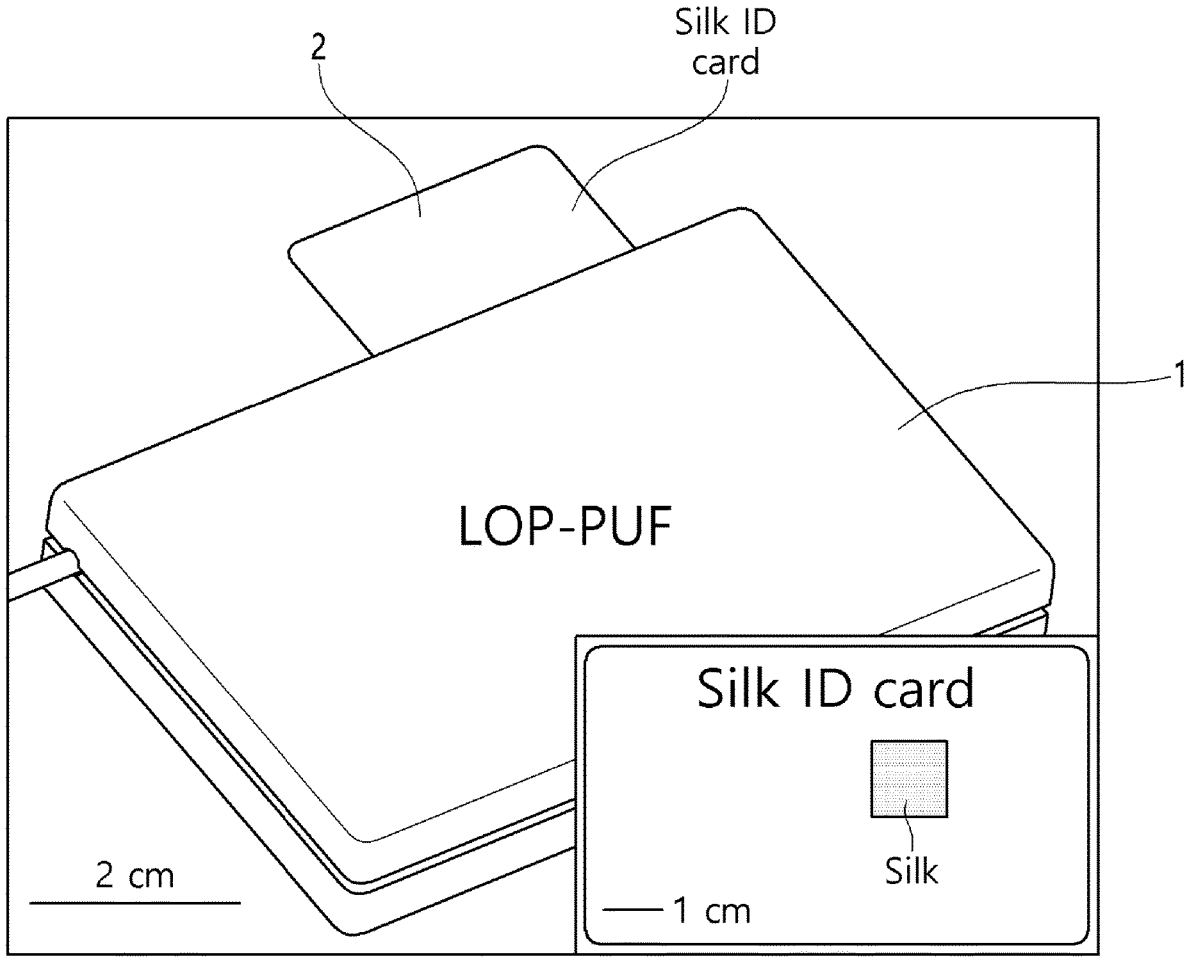
FIG. 1 is a view illustrating a state in which a PUF ID is mounted on a PUF ID reader according to an embodiment.

Hereinafter, specific embodiments of the present disclosure will be described in detail with reference to the drawings. However, the spirit of the present disclosure is not limited to the following embodiments, and those of ordinary skill in the art who understand the spirit of the present disclosure will be able to easily suggest other embodiments falling within the scope of the same idea by adding, changing, deleting, and adding components. This may also fall within the scope of the present disclosure.

In the description of the drawings, the same or similar components are denoted by the same reference numerals throughout the drawings, and redundant descriptions thereof may be omitted.

The suffixes "module" and "unit" for components used in the description below are assigned or mixed in consideration of easiness in writing the specification and do not have distinctive meanings or roles by themselves.

In the following description, detailed descriptions of well-known functions embodiment will be omitted since they would obscure the invention in unnecessary detail.

The accompanying drawings are used to help easily understanding embodiments disclosed herein but the technical idea of the present disclosure is not limited thereto. It will be understood that the present disclosure includes all modifications, equivalents, and substitutes falling within the spirit and scope of various embodiments of the disclosure.

It will be understood that although the terms "first," "second" etc. may be used herein to describe various elements, these elements should not be limited by these terms. These terms are only used to distinguish one element from another.

It will be understood that when an element is "connected" or "coupled" to another element, the element may be directly connected or coupled to the other element or may be "connected" or "coupled" to the other element with an intervening element therebetween. On the other hand, it will be understood when an element is "directly connected" or "directly coupled" to another element, no intervening element is present therebetween.

The singular forms "a," "an," and "the" as used herein are intended to include the plural forms as well unless the context clearly indicates otherwise.

The terms "comprises," "comprising," "including," and "having," as used in this application are inclusive and therefore specify the presence of stated features, integers, steps, operations, elements, or components, but do not preclude the presence or addition of one or more other features, integers, steps, operations, elements, components, or combinations thereof.

Figure 2:
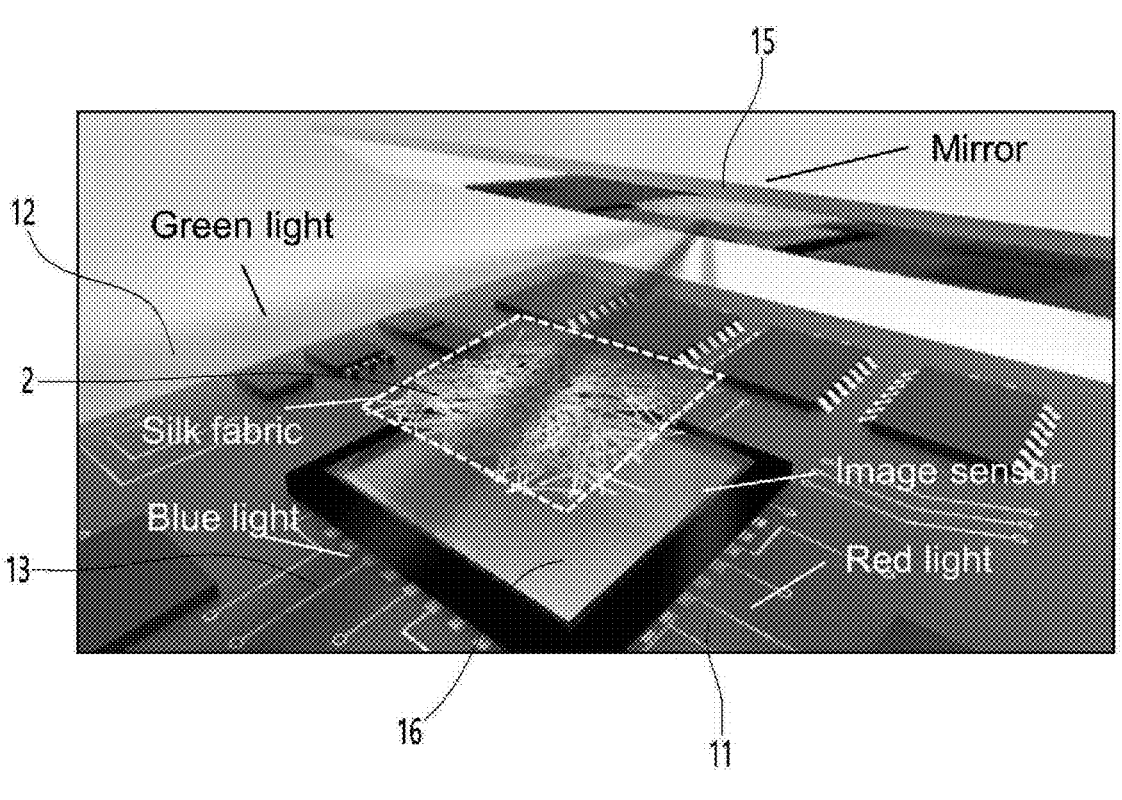
FIG. 2 is a view for describing an operation of reading the PUF ID in the PUF ID reader.

FIG. 1 is a view illustrating a state in which a PUF ID is mounted on a PUF ID reader according to an embodiment, and FIG. 2 is a view for describing an operation of reading the PUF ID in the PUF ID reader.

Referring to FIGS. 1 and 2, a PUF ID 2 is disposed in a PUF ID reader 1. In this state, lights 11, 12, and 13 emitted from red, green, and blue light emitting diodes pass through the PUF ID 2 and are sensed by an image sensor 16. The image sensor 16 may obtain digital data through image processing.

The lights 11, 12, and 13 diffract and interfere through the PUF ID 2. Therefore, a plurality of light spots (hereinafter, simply referred to as spots) may be formed in the image sensor 16. The positions of the generated light spots may change according to a light incidence angle.

The light spots may be sensed by the image sensor 16 without a separate complicated optical system or imaging device. To this end, the PUF ID 2 and the image sensor 16 may be arranged adjacent to each other on an optical path. That is, the PUF ID 2 may be directly aligned upstream on the optical path, and the image sensor 16 may be directly aligned downstream on the optical path. The PUF ID 2 and the image sensor 16 may be spaced apart from each other by a predetermined distance. The PUF ID 2 and the image sensor 16 may be directly aligned vertically or horizontally. Considering that the two members are two-dimensional materials, the PUF ID 2 and the image sensor 16 may be directly aligned vertically.

In order to obtain random properties of spots and the property of forming a plurality of spots, the PUF ID 2 may use a random fibrous medium. The PUF ID 2 may have a predetermined frame supporting the random fibrous medium.

Examples of the random fibrous medium may be a medium in which fibers are entangled with each other. It is important that, when the random fibrous medium is two-dimensionally projected, a portion occupied by the fiber and a portion without the fiber necessarily exist. It is important that, when the random fibrous medium is two-dimensionally projected, a portion without fiber necessarily exists even if the fibers are overlapped in several layers. The portion without the fiber may later provide a hole (aperture) to provide the spot. In the two-dimensional projection area of the random fibrous medium, there are a portion on which the fiber is projected and a portion on which the fiber is not projected.

For example, the random fibrous medium may be a cocoon skin of a cocoon. The cocoon skin of the cocoon does not refer to a silk fiber spun in a state of silk, and refers to a cocoon film that a silkworm peels from the surface of the cocoon randomly made with fibers extracted by the silkworm. For this reason, improved random characteristics may be obtained.

The random fibrous medium may form a predetermined closed curve in a direction crossing the optical path of light while being entangled with each other. The closed curve may provide a hole through which light passes. The light passing through the hole may form the spot behind a predetermined distance of the PUF ID 2 through diffraction and interference. Contrast may be significantly different between a place where the spot is formed and a place where the spot is not formed. Therefore, digital information may be conveniently processed through the general image sensor 16. When the size of the hole is 26-47 micrometers, the effect of light diffraction and interference may be maximized. The size of the hole may be referred to as a diameter when the area of the hole is converted into an equal area circle.

A light source of a single wavelength may be used instead of the red, green, and blue light emitting diodes. However, when the red, green, and blue light emitting diodes are used, different light spots for each wavelength may be obtained, thereby further improving the performance of the PUF. Of course, the color is not limited to red, green, and blue, and lights of various wavelengths may be used.

The light is incoherent light, and light that may cause diffraction and interference may be used. The red, green, and blue lights are an example. This may be an advantage of reducing expensive costs by using the conventional coherent laser beam.

The PUF ID reader 1 may further include a mirror 15 for condensing and reflecting the three-color light. A slot into which the ID is inserted may be provided in the PUF ID reader 1.

Figure 3:
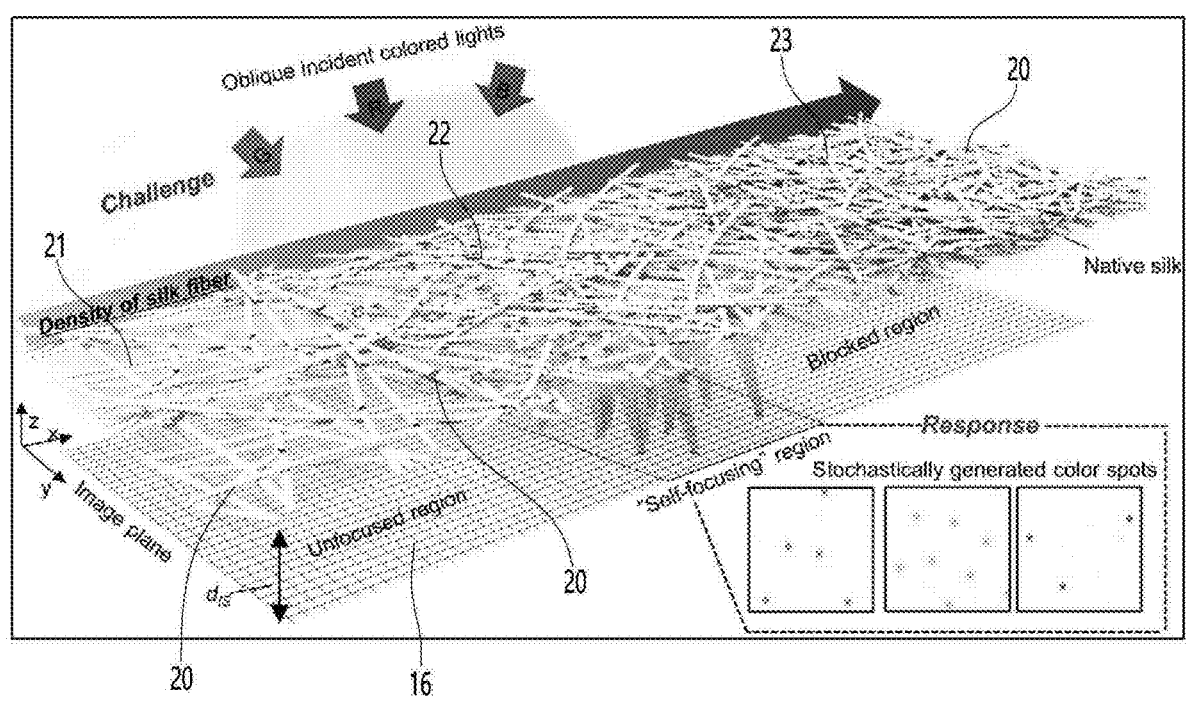
FIG. 3 is a view for describing a random fibrous medium.

FIG. 3 is a view for describing the random fibrous medium.

Referring to FIG. 3, the fibers 20 are entangled in the random fibrous medium. In the drawings, for convenience of explanation, the random fibrous medium may be divided into a sparse region 21, an appropriate region 22, and an excessively dense region 23.

The sparse region 21 refers to a region in which fibers are sparse because the density of fibers is low. In the sparse region, the number of spots is excessively small because the density of fibers is low, and the size of the hole defining the spot is excessively large. Thus, it is difficult to expect light diffraction and interference effects.

The excessively dense region 23 refers to a region in which fibers are dense because the density of fibers is high. In the excessively dense region, the number of spots is excessively small because the density of fibers is high so that light cannot pass therethrough, and the light quantity of the spots is excessively low because the hole is small. Thus, the contrast may be lowered.

In the appropriate region 22, the three-color lights, that is, the red, green, and blue lights may be independently diffracted and interfered with each other. In this manner, it can be confirmed that red, green, blue spots are formed. When the density of fibers in the appropriate region is provided, a predetermined distance has to be maintained between the random fibrous medium and the image sensor 16. This is because the spots can be accurately formed in this manner.

FIG. 4 is a view for describing the random fibrous medium in the appropriate region.

Figure 4A:
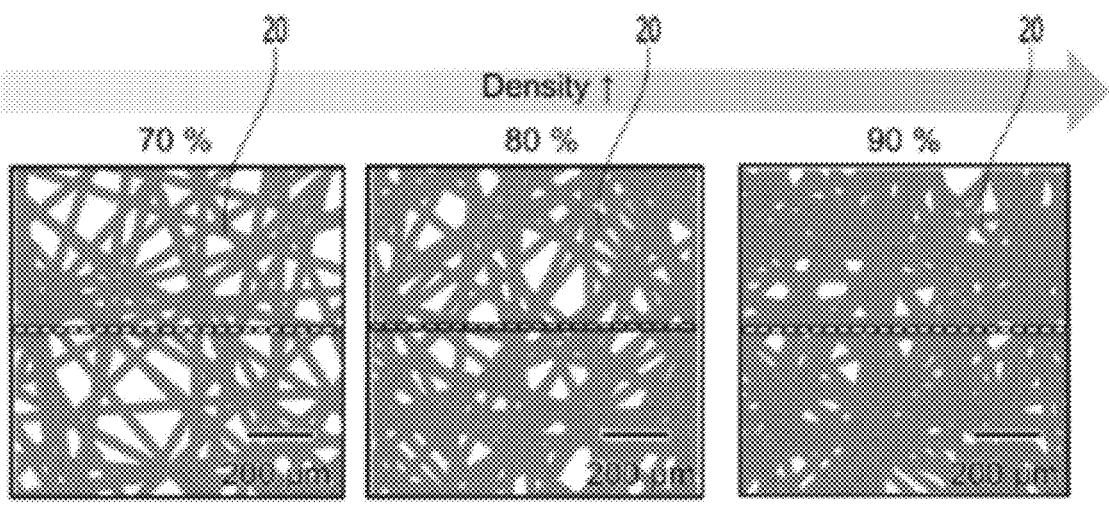
FIGS. 4(a), 4(b), 4(c), and (4d) are views for describing a random fibrous medium in an appropriate region.

FIG. 4(a) illustrates cases in which the proportion of fibers in the two-dimensional projection area of the random fibrous medium is 70%, 80%, and 90%. When the proportion of fibers is greater than 90%, it is not preferable because the size of the hole is excessively small and it is difficult for light to pass therethrough. When the proportion of fibers is less than 70%, it is not preferable because light diffracts and interferes smoothly.

Figure 4B:
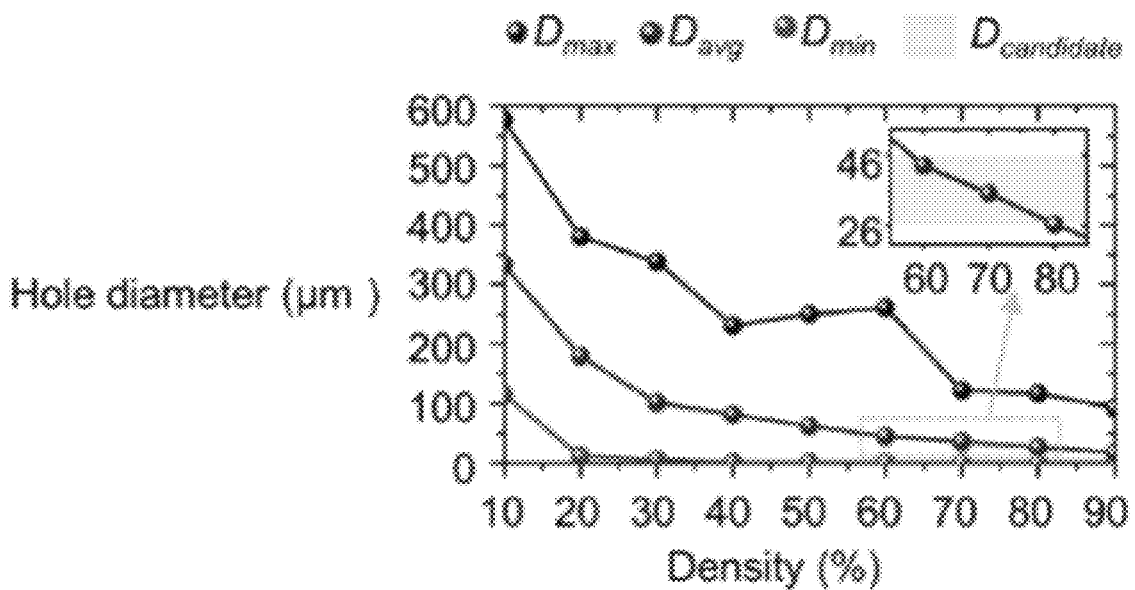

FIG. 4(b) is a graph showing the maximum size, average size, and minimum size of the hole by the fiber ratio of the random fibrous medium based on the geometric average diameter (D) of the hole. It can be confirmed that the size of 26-47 micrometers, which is the appropriate size of the hole, reaches about 56-83%.

Figure 4C:
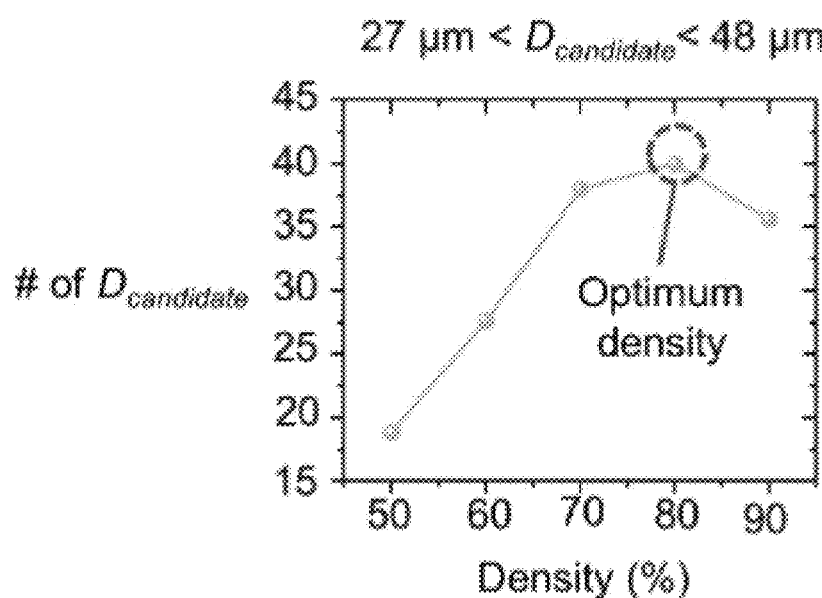

FIG. 4(c) is a graph showing the number of holes having a size of 26-47 micrometers, which is the appropriate size of the hole. It can be confirmed that, in the case of 65-90%, the number of holes is the largest.

Figure 4D:
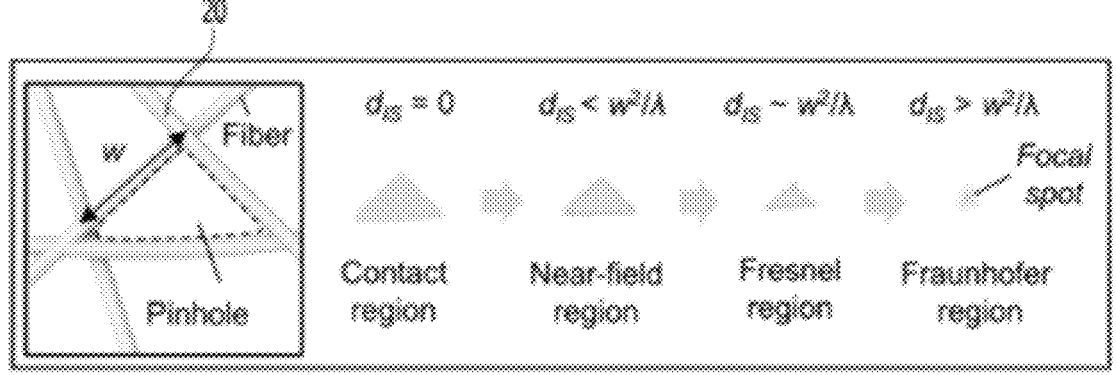

FIG. 4(d) is a view illustrating that spots are formed for each distance between the hole and the image sensor. Referring to FIG. 4(d), it can be confirmed that no spots are formed when a distance dis from the hole to the image sensor is zero. As the distance dis increases gradually, the spot becomes smaller. Light is condensed in a Fresnel region, but spots are not formed. It can be confirmed that spots are formed within the range of a Fraunhofer region. As the distance dis is further away from the Fraunhofer region, the spot may disappear and extend.

Therefore, it is preferable that the distance between the random fibrous medium and the image sensor is in the Fraunhofer region. When the size of the hole is 26-47 micrometers, the distance dis may be 0.2-1.7 millimeters.

The spot formation in the Fraunhofer region will be described in more detail.

Figure 5A:
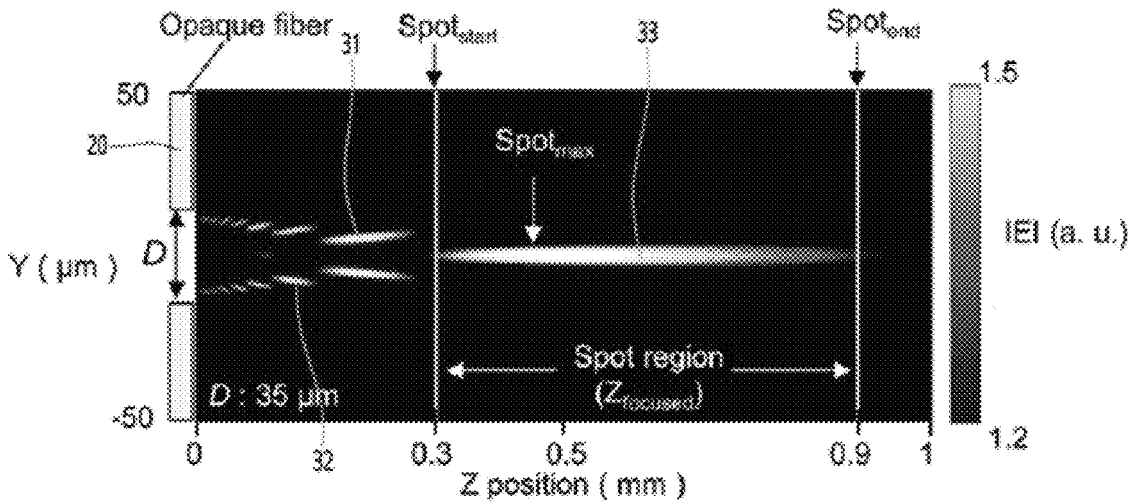
FIG. 5(a) is a simulation diagram for describing interference of light passing through a hole (aperture) made by fibers and constructive interference of light due to diffraction.
Figure 5B:
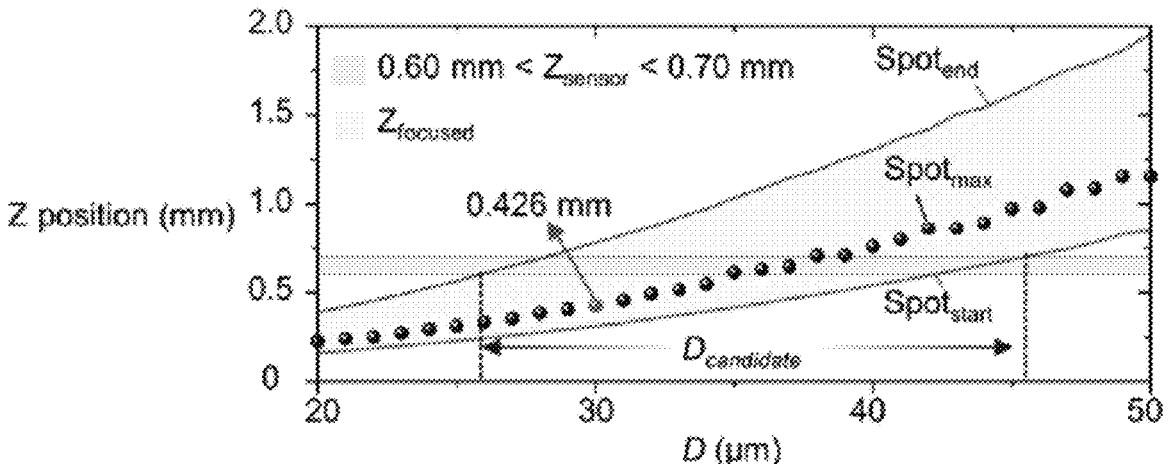
FIG. 5(b) is a view illustrating that a spot is formed in a Fraunhofer region.

FIG. 5(a) is a simulation diagram for describing interference of light passing through the hole made by fibers and constructive interference of light due to diffraction, and FIG. 5(b) is a view illustrating that the spot is formed in the Fraunhofer region.

Referring to FIG. 5, the light passing through the hole defined by the fiber 20 diffracts and interferes, and a first constructive interference 31 starting from an edge of a first fiber and a second constructive interference 32 starting from an edge of a second fiber are shown. After that, when entering the Fraunhofer region, the spot may be formed. The spot may be created by a single third constructive interference 33. Due to a single third constructive interference 33, the spot may be created. A pattern of the third constructive interference and the spot may be formed in the central portion of the projection region of the hole.

When the diameter D of the hole is 26-47 micrometers, the distance dis corresponding to the Fraunhofer region may be 0.2-1.7 millimeters. More preferably, the distance dis is most preferably 0.6-0.7 millimeters so that the size of the spot is the largest in the Fraunhofer region and corresponds to the center.

FIGS. 6 and 7 are views for describing fibers of the random fibrous medium.

Figure 6A:
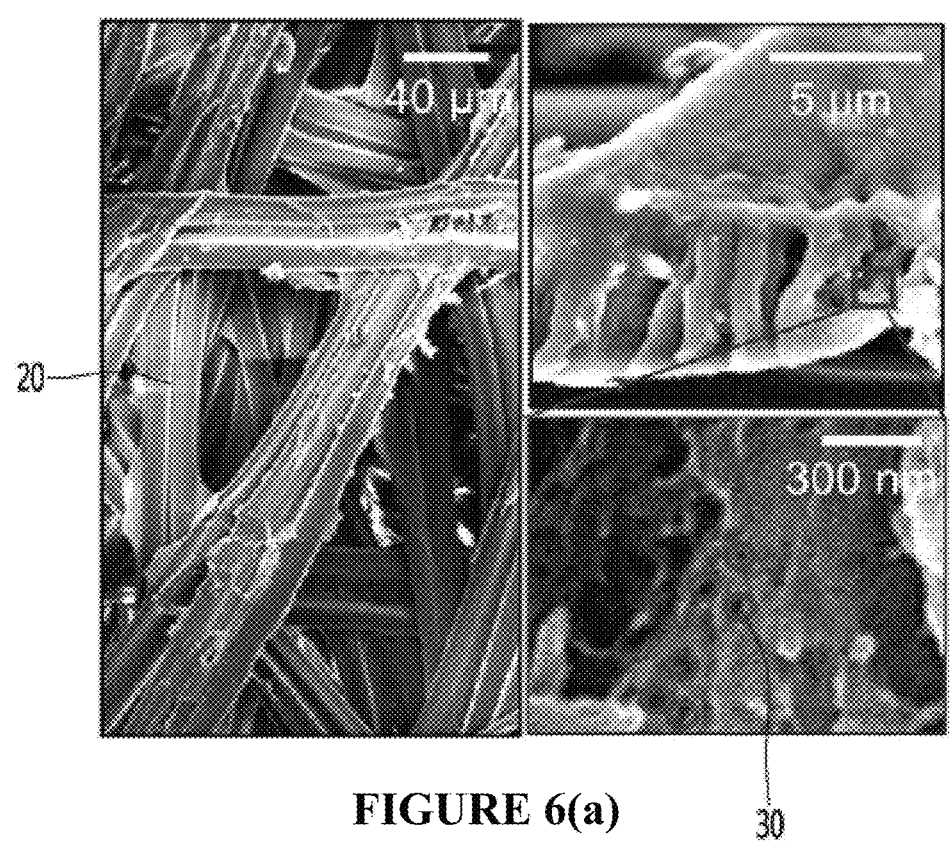
Figure 6B:
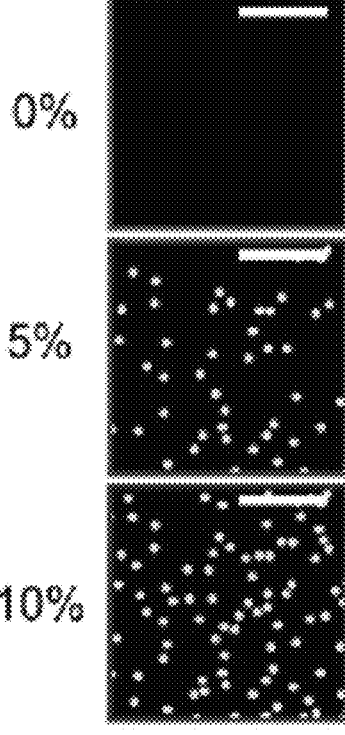

FIG. 6(a) is a photomicrograph of the random fibrous medium with respect to the skin of the cocoon, and FIG. 6(b) is a view showing the density of nano-sized holes inside the fiber.

Referring to FIG. 6(a), it can be confirmed that a plurality of nanoholes 30 are provided in the fibers of the cocoon. Due to the nanoholes, the fibers 20 may be opaque. Therefore, it can be close to the lowermost photograph in FIG. 6(b).

The nanoholes may make the cocoon fiber opaque, and this configuration may provide the spots smoothly.

Figure 7A:
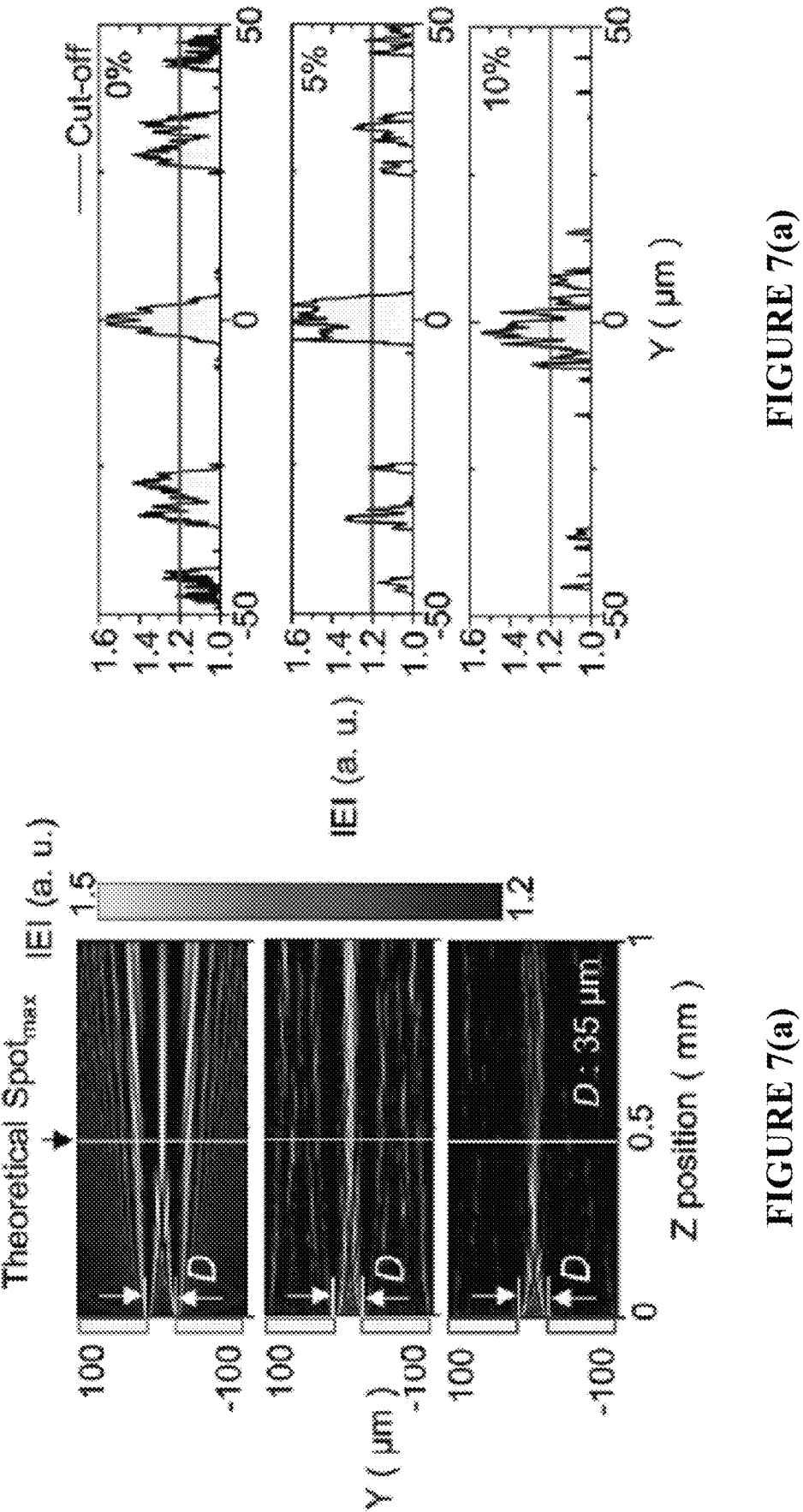

FIG. 7(a) is a view showing constructive interference of light in each case of FIG. 6(b). Referring to the uppermost drawing, it can be seen that the spots are not formed because constructive interference is not appropriate when the fibers are transparent due to the absence of the nanoholes. It can be confirmed that, as the number of nanoholes increases, constructive interference is properly formed so that a single spot is formed in the center.

FIG. 7(b) is a graph in which intensity I of light is measured at a place spaced apart from the hole by a predetermined distance in each case of FIG. 7(a). In this regard, it can be seen that light is well concentrated in one spot in the case of the opaque fiber. Therefore, the contrast may be improved.

As the random fibrous medium, media other than the cocoon skin of the cocoon may be used. Specifically, it can be used in any form as long as it is a fibrous material in which opaque fibers are randomly entangled. It is preferable to prevent light from being transmitted through the opaque fiber. In order to provide the opaque fiber, it may be spun by adding a dye or a pigment without forming nanoholes. Electrospinning may be used to cause the fibers to be randomly spun.

Figure 8:
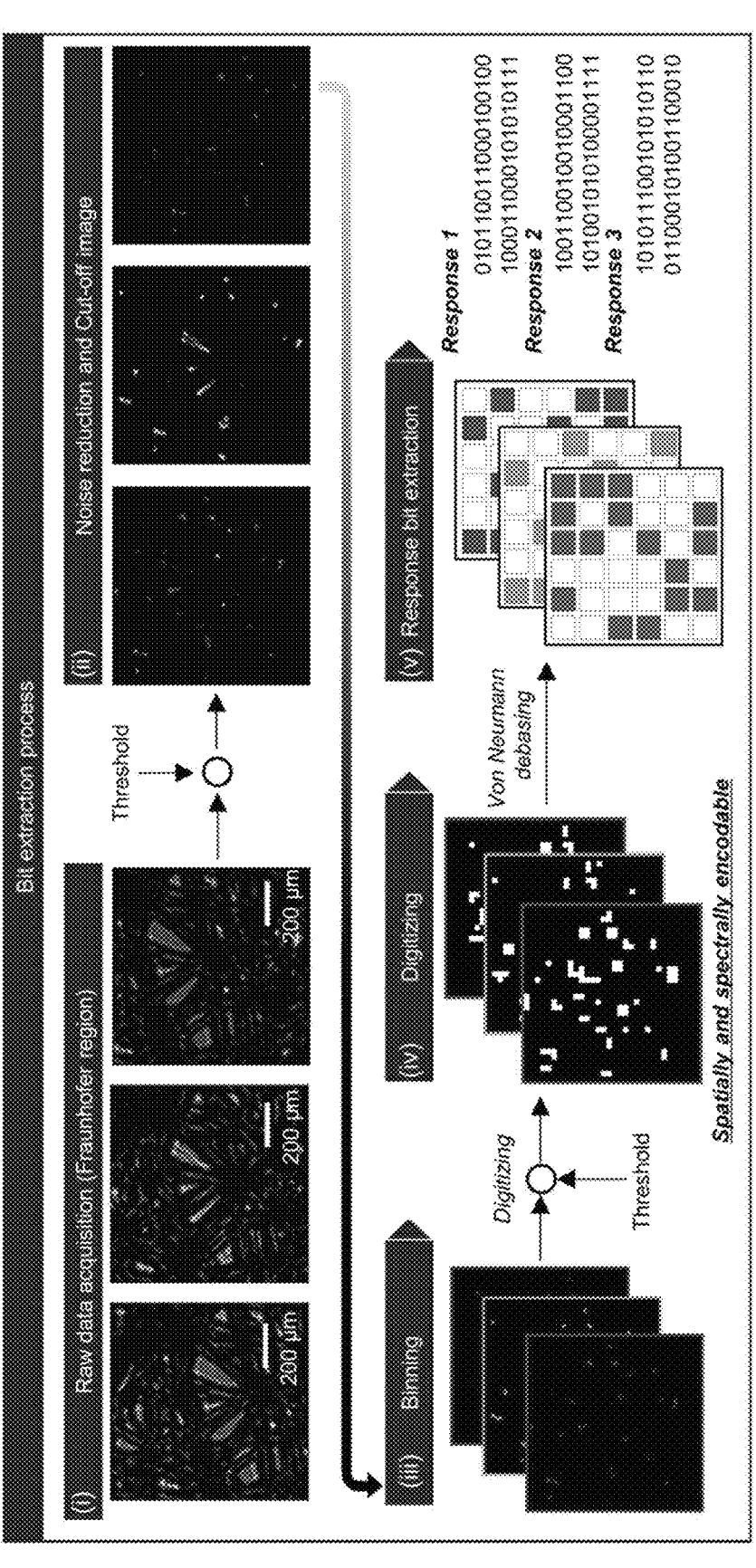
FIG. 8 is a view for describing the operation of the PUF ID reader.

FIG. 8 is a view for describing the operation of the PUF ID reader.

Referring to FIG. 8, images of three colors, that is, red, green, and blue, are acquired by the image sensor 16. After that, noise is removed. When removing noise, even pixels that do not reach a predetermined intensity may be removed. After collecting the red, green, and blue images from which the noise is removed, digital processing may be performed and then encrypted bit information may be output.

Figure 9:
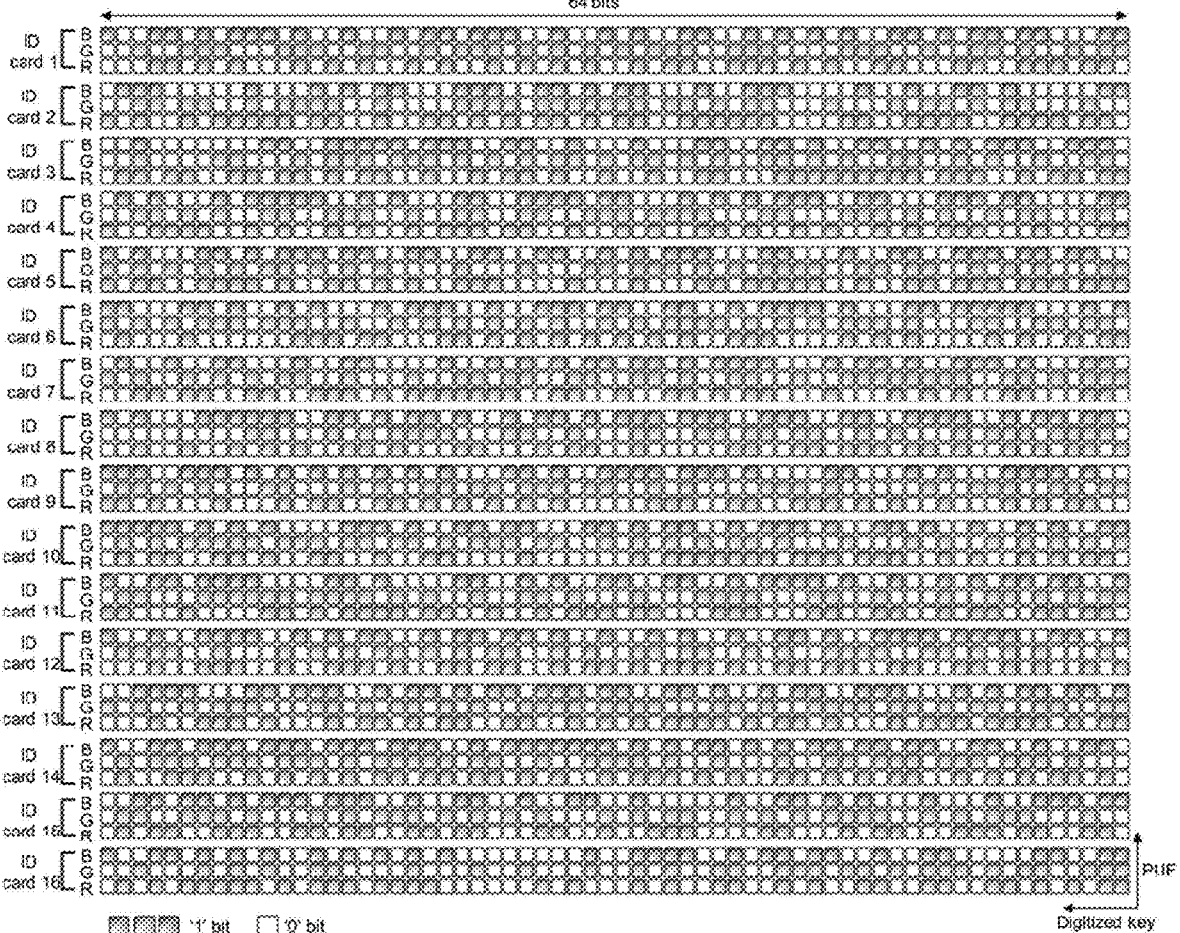
FIG. 9 illustrates bitwise information of a PUF ID according to an embodiment.

FIG. 9 illustrates bitwise information.

Referring to FIG. 9, as a result of testing a plurality of PUF IDs 1, it can be confirmed that each ID has a sufficient hamming distance as binarized information and has a random property.

INDUSTRIAL APPLICABILITY

As described in embodiments, a small-sized imaging setup, a low-cost light source, and a low-cost optical random element are required. Therefore, in the present disclosure, a random fibrous medium that can be manufactured at low cost (which can be exemplified by natural silk (cocooned film) is used, and an incoherent low-cost light emitting diode is used. diode) is used. The random fibrous medium forms a hole (aperture) through which light can pass spatially randomly, and the light emitted through the hole experiences light diffraction and interference. Due to such an optical phenomenon, a phenomenon in which light is strongly concentrated at a predetermined distance (Fraunhofer region) from the fibrous medium occurs. This phenomenon can also be referred to as self-focusing. Due to this phenomenon, it is possible to implement the setup of the PUF device that does not require a lens for imaging.

The above description is merely illustrative of the technical spirit of the present disclosure, and various modifications and changes can be made by those of ordinary skill in the art, without departing from the scope of the present disclosure.

Therefore, the embodiments disclosed in the present disclosure are not intended to limit the technical spirit of the present disclosure, but are intended to explain the technical spirit of the present disclosure. The scope of the technical spirit of the present disclosure is not limited by these embodiments.

The scope of the present disclosure should be interpreted by the appended claims, and all technical ideas within the scope equivalent thereto should be construed as falling within the scope of the present disclosure.

What is claimed is:

1. A physically unclonable function (PUF) identifier (ID) reader comprising:
   a PUF ID comprising:
      a fibrous medium having a two-dimensional surface in which a plurality of fibers is entangled; and
      a frame configured to support the fibrous medium; and
   a light source configured to project incoherent light through the two-dimensional surface of the supported fibrous medium of the PUF ID; and
   an image sensor having a directly vertically aligned surface with respect to the two-dimensional surface of the supported fibrous medium, and configured to sense the projected incoherent light through the PUF ID onto the directly vertically aligned surface by obtaining digital data of the projected incoherent light on the directly vertically aligned surface through image processing,
   wherein, when projecting the incoherent light through the two-dimensional surface of the fibrous medium, a two-dimensionally projected area on the directly vertically aligned surface includes a first portion on which the fibers are projected and a second portion on which the fibers are not projected,

wherein the fibers are opaque,
wherein the fibrous medium is a cocoon film peeled from a surface of a cocoon, and
wherein a proportion of the first portion made by the cocoon film is 70-90%.

2. The PUF ID reader of claim 1, wherein the second portion on which the fibers are not projected forms a closed curve by the fibers.

3. The PUF ID reader of claim 2,
wherein the closed curve defines a hole, and
wherein, when the hole is converted into a circle, the circle has a diameter of 26-47 micrometers.

4. The PUF ID reader of claim 1, wherein the fiber includes a nanohole or includes a dye or a pigment.

5. A physically unclonable function (PUF) identifier (ID) reader comprising:
   a PUF ID including a two-dimensional fibrous medium having a planar surface in which fibers are entangled;
   a light source configured to project incoherent light through the planar surface of the two-dimensional fibrous medium of the PUF ID; and
   an image sensor having a directly vertically aligned surface with respect to the planar surface of the two-dimensional fibrous medium, and configured to sense the projected incoherent light through the PUF ID onto the directly vertically aligned surface by obtaining digital data of the projected incoherent light on the directly vertically aligned surface through image processing,
   wherein, when projecting the incoherent light through the planar surface of the fibrous medium, a two-dimensionally projected area on the directly vertically aligned surface includes a first portion in which the light meets the fibers and a second portion in which the light does not meet the fibers,
   wherein at least a part of the second portion is defined as an inner region of a closed curve bordering on the fibers,
   wherein the fibrous medium includes at least a cocoon film peeled from a surface of a cocoon, and
   wherein a proportion of the first portion made by the cocoon film is 70-90%.

6. The PUF ID reader of claim 5, wherein the fibers are opaque.

7. The PUF ID reader of claim 5, wherein, when an area of the inner region of the closed curve is converted into circles, a diameter of at least one of the circles is included in a range of 26-47 micrometers.

8. The PUF ID reader of claim 5, wherein the fiber includes a nano-scale hole and is opaque.

* * * * *